Figure 1:
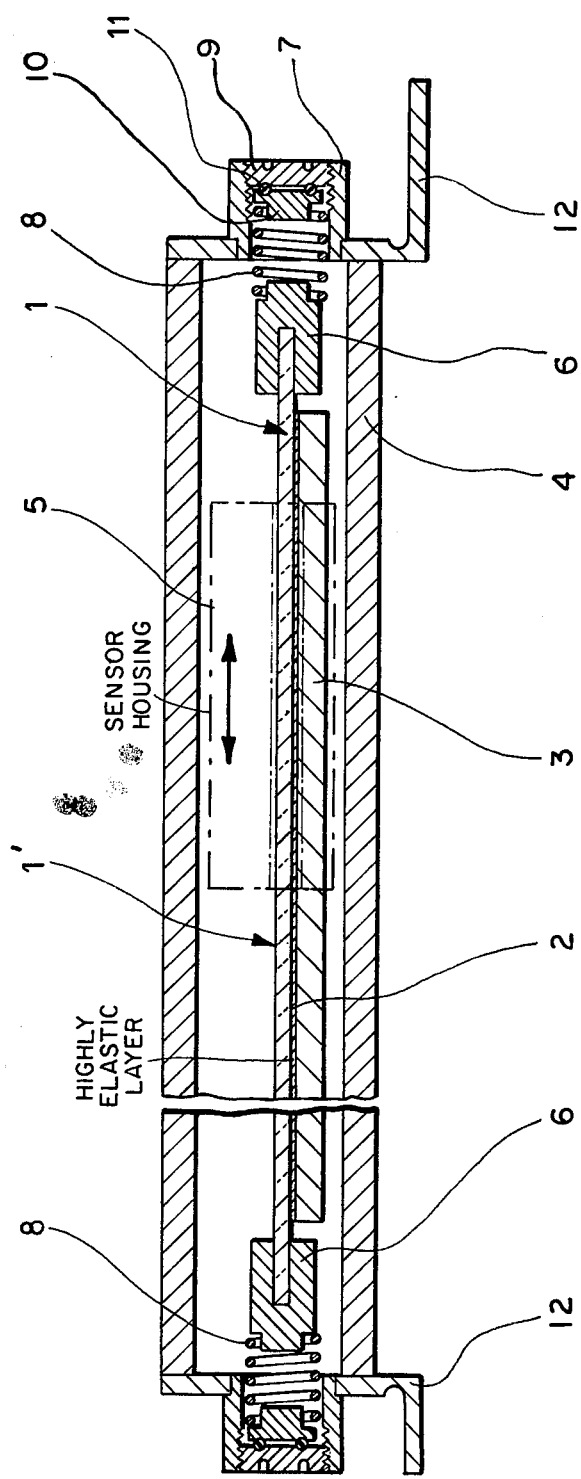

United States Patent
Ernst

[11] 4,060,903
[45] Dec. 6, 1977

[54] COMPENSATION OF ERRORS IN INCREMENTAL MEASURING OR POSITIONING INSTRUMENTS

[75] Inventor: Alfons Ernst, Traunreut, Germany

[73] Assignee: Dr. Johannes Heidenhain GmbH, Traunreut, Germany

[21] Appl. No.: 679,170

[22] Filed: Apr. 22, 1976

[30] Foreign Application Priority Data

Apr. 26, 1975 Germany .............................. 2518745

[51] Int. Cl.² .............................................. G01B 11/04
[52] U.S. Cl. .............................. 33/125 R; 33/125 C; 250/237 G; 356/169
[58] Field of Search ................... 250/237 G; 356/169, 356/170; 33/125 R, 125 A, 125 C, 125 T, 137 L, 1 L

[56] References Cited

U.S. PATENT DOCUMENTS

| 398,851 | 3/1889 | Schulze-Berge | 33/137 L |
| 3,236,124 | 2/1966 | Rhoades | 33/125 T |
| 3,629,945 | 12/1971 | Liuzzo | 33/125 A |
| 3,816,002 | 6/1974 | Wieg | 356/169 |
| 3,942,895 | 3/1976 | Meyer et al. | 33/125 C |

*Primary Examiner*—Richard E. Aegerter
*Assistant Examiner*—John W. Shepperd
*Attorney, Agent, or Firm*—Hume, Clement, Brinks, Willian & Olds, Ltd.

[57] ABSTRACT

A method and apparatus for the compensation of guiding errors in an incremental measuring instrument used in conjunction with machine tools or measuring machines is disclosed in which the measuring graduation is corrected in its mounting position in accordance with the error values of the machine. A preferred embodiment of this method is disclosed in which the error compensation is accomplished by the application of equal longitudinal compression or extension forces to the ends of the measuring graduation.

15 Claims, 2 Drawing Figures

COMPENSATION OF ERRORS IN INCREMENTAL MEASURING OR POSITIONING INSTRUMENTS

This invention relates to a method and an apparatus for the compensation of errors or imprecisions in a machine equipped with a measuring installation.

Machining imprecisions, particularly guiding errors on a machine tool or a measuring machine, cause the actual displacement of the machine part (or the object) being positioned to be either larger or smaller than the shifting actually determined by the measuring installation. As a result, errors are created which are outside permissible machining tolerances. The production of highly precisioned guide means to eliminate the aforementioned problem is particularly difficult and costly in large machine tools or measuring machines. Moreover, during the course of time, the permissible machine tolerances may be exceeded due to wear in the guide means.

Various methods and devices have been developed to eliminate or compensate for these errors or imprecisions in machine tools and measuring machines. For example, column 1 of the German Auslegeschrift No. 1,477,390 discloses the compensation of guiding errors by concurrently recording the errors and then exerting counterforces via a trailing system to guide the machine. Such compensation systems are costly and expensive. The German Offenlegungsschrift No. 2,042,505 utilizes corrective rulers for the compensation of errors, which show elevations or recesses, according to the type of imprecision of the machine parts. In such a system, the corrective rulers are sensed via a lever system which readjusts the measuring system and/or its sensor head commensurate with the corrective function. The production of such a corrective ruler is difficult and costly. Moreover, due to the changing error values, the corrective ruler must eventually be replaced. Adjustable corrective signals as disclosed in the German Ausleges-chrift No. 1,231,595 are expensive to build.

In another known error compensation method disclosed in German Auslegeschrift No. 1,552,273, cams are placed at certain points of the travel path where a correction is to be made. As these cams are passed, a correction signal is released by them. However, the adjustment of the correction cams is particularly difficult and time-consuming with large machines. Moreover, it is known, from the U.S. Pat. No. 2,988,681, to compensate for machine mechanical errors with the aid of a "correction computer." The effects of all influential values having a bearing on machine errors are stored in the computer's memory, so that the associated corrective signal can be superposed over the actual signal in relationship to the prevailing feed position.

This invention relates to a method and an apparatus for the dependable compensation of errors in an incremental measuring or positioning system which is accomplished in a particularly simple fashion and with a minimum of construction costs. Essentially, this dependable compensation of errors is accomplished in accordance with this invention by the fact that the measuring graduation of the measuring installation is corrected in its mounting position in accordance with the error values of the machine and, in particular, by the exertion of a force on the measuring graduation.

In a preferred aspect of this invention, the compensation of the errors is accomplished by the longitudinal compression or extension of the measuring graduation through the application of forces of equal magnitude in opposite directions at the ends of the measuring graduation. Only two compression or extension devices are needed to practice this preferred embodiment of the error compensation method of this invention. These two devices are attached at the ends of the measuring graduation and exert forces of equal magnitude on the ends of the graduation in the axial or longitudinal direction of the graduation. A particularly precise compensation of errors is possible when this preferred aspect of the invention is practiced.

Thus, this invention provides particularly simple means of compensating for guiding errors which can be synchronized for a certain machine following its fabrication. This results, among other things, in favorable manufacturing costs for the machine, since broader tolerances are permissible in the fabrication of components of the machine. Likewise, the service life of the machine can be extended because the method of compensation of this invention permits a readjustment of the measuring graduation in a simple manner and without additional construction costs even with changing error values.

Additional features and advantages of this invention are described in, and will appear from, the description of the preferred embodiments which follow and from the drawings.

Figure 2:
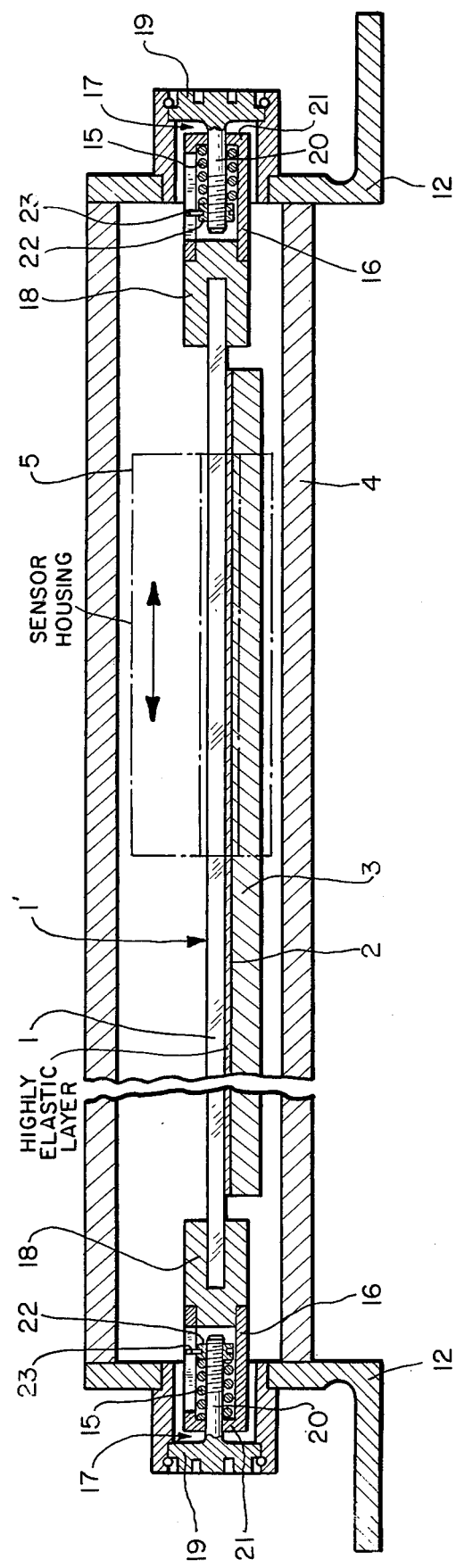

In the drawings, FIG. 1 illustrates a sectional view of a preferred embodiment of this invention equipped with a compression-type error compensation device; and, FIG. 2 illustrates a sectional view of a preferred embodiment equipped with an extension-type error compensation device.

In the preferred embodiments illustrated in the drawings, reference numeral 1 identifies the measuring graduation scale of an incremental longitudinal measuring system or instrument, such as the one described in copending U.S. patent application Ser. No. 656,746, filed Feb. 9, 1976 for a LENGTH MEASURING INSTRUMENT by Gunther Nelle, Alfons Ernst, Siegbert Holstein, and Alfred Affa, the disclosure of which is hereby incorporated herein by reference. The measuring grid is located along surface 1' of measuring graduation 1. The measuring graduation 1 is fastened to a protruding portion 3 of a U-shaped hollow body 4 by a highly resilient layer 2 interposed between the graduation 1 and the protruding portion 3. This hollow body 4, which is resistant to bending, is sealed by sealing lips (not illustrated) and guards the measuring graduation 1 and the photoelectric sensor housing unit 5 against disturbing environmental influences. The sensor unit 5 embraces the measuring graduation 1 in the area range protruding against portion 3 of hollow body 4. In the preferred embodiment illustrated in the drawing, the measuring graduation 1 is a glass body and the U-shaped hollow body 4 is an extruded aluminum profile. The U-shaped hollow body 4 is fastened to one of the machine parts (or objects), whose relative position is to be measured or adjusted, via joint-like fastening members, or angles, 12, which have a weak point. By fastening the hollow body 4 to one of the parts or objects to be measured through the joint-like parts 12, practically no compulsive forces are exerted during the mounting of the measuring instrument on the machine.

Mechanical errors in machine tools or measuring machines, particularly guide errors, cause the actual displacement of the part or object to be adjusted to deviate from the displacement registered by the measuring instrument. The compensation of such machine errors is carried out according to this invention either by the longitudinal compression or the longitudinal extension of the graduation scale 1. This correction at the graduation scale 1 is accomplished by having forces of equal magnitude act on the ends of the graduation scale 1 in opposite directions. Depending on whether the actual shifting of the machine part to be positioned is larger or smaller than the shifting determined by the measuring system, the graduation 1 is readjusted commensurate with the magnitude of the machine errors, either by the compression or the stretching of the measuring graduation 1.

The preferred embodiment of the invention illustrated in FIG. 1 exemplifies an incremental measuring system equipped with a compression type error compensation device. This compression device contains a pressure spring 8 at each end of the measuring graduation 1. Each pressure spring 8 is located in a housing 7 fastened to fastening member 12. Each pressure spring 8 is seated at the base end of a V-shaped bracket 6 which fits around one terminal part or end of the graduation scale 1 and through which the spring 8 exerts a force on the graduation scale. An adjustable nut 9 is provided at the opposite end of each pressure spring 8, the pressure spring 8 being seated thereon via an axial bearing 10, 11. A correction at the graduated scale 1 is carried out by turning the two nuts 9 provided at the opposite ends of the measuring instrument. The forces of equal magnitude exerted thereby against the ends of the graduation 1 cause a compression of the graduation scale 1. An optimal correction at the graduation scale 1 may be accomplished if the actual shifting of the machine part to be positioned agrees with the displacement determined by the measuring graduation 1 and the sensor unit 5 of the measuring instrument.

The embodiment illustrated in FIG. 2 exemplifies an incremental measuring system equipped with an extension-type error-compensation device which permits the longitudinal stretching of the graduated measuring scale. This extension device contains a coil spring 15 at each end of measuring scale 1. Each spring 15 is disposed within a sleeve 16 located in a recess 17 formed in fastening member 12. This outside end of spring 15 is seated against the outer end 21 of sleeve 16. The inner end of each sleeve 16 is connected to the base of a U-shaped bracket 18 which fits around and is fastened to one terminal end of graduation scale 1. A screw 19 is mounted at the outer end of each recess 17, which screws 19 are provided with a shaft 20 extending through the outer end 21 of sleeve 16, through the inside of the coils of springs 15. The end of each shaft 20 is provided with a nut 22 on which the inside end of a spring 15 is seated. A safety 23 is provided against torsion for nut 22. A correction of the measuring errors at graduation scale 1 is carried out by turning the two screws 19 which compress coil springs 15 via shafts 20 and nuts 22. This in turn causes an extension of graduation scale 1 by the outward forces produced by springs 15 against the outer ends 21 of sleeves 16 which extends scale 1 via U-shaped brackets 18.

This invention is not limited to the compression and extension apparatus shown in the drawings and is not limited to the use of springs to generate the forces applied to the graduated scale, as other equivalent means, such as hydraulic or pneumatic means, also may be employed to generate the forces on the scale.

The embodiments described herein are intended to be exemplary of the types of measuring instrument graduation error compensation systems which fall within the scope of the invention. However, as already noted, one skilled in the art would certainly be expected to be able to make modifications and variations of the embodiments described herein without departing from the spirit and scope of the invention as defined in the following claims.

What is claimed is:

1. A digital electrical measuring instrument for measuring or adjusting the relative position of two objects which compensates for the guiding errors of the two objects, comprising:
  a longitudinally extending, bending resistance hollow body having means for attachment to one of the objects;
  a longitudinally extending, bending resistant measuring scale within the hollow body, fastened to the hollow body by a highly elastic layer interposed between only a single surface of the scale and the adjacent surface of the hollow body;
  a scanning head within the hollow body, having a connecting means extending out of the hollow body for attachment to the other object; and
  adjustable first and second force-generating means mounted at the longitudinal ends of the hollow body for applying forces, acting in opposite directions, to the longitudinal ends of the measuring scale, whereby forces of equal magnitude, acting in opposite directions, may be applied to the longitudinal ends to adjust the length of the scale to compensate for the guiding errors of the objects.

2. The measuring instrument of claim 1, wherein the scanning head includes a photoelectric sensor and the measuring scale is glass.

3. The measuring instrument of claim 1, wherein the first and second force-generating means each include a spring for generating the force to the end of the scale and a means for adjusting the force applied by the spring.

4. The measuring instrument of claim 1, wherein the first and second force-generating means are compressive force-generating means for applying compressive forces to the measuring scale to compress the length of the scale.

5. The measuring instrument of claim 4, wherein the body has a recess at each longitudinal end; and the first and second force-generating means each include a bracket fitting around a longitudinal end of the scale; a coil spring disposed within the recess for applying a compressive force to the bracket; and an adjustable nut and axial bearing for adjusting the magnitude of the force applied by the spring.

6. The measuring instrument of claim 1, wherein the first and second force-generating means are tensive force-generating means for applying stretching forces to the measuring scale to stretch the length of the scale.

7. The measuring instrument of claim 6, wherein the body has a recess at each longitudinal end; and the first and second force-generating means each includes a bracket attached to a longitudinal end of the scale; a sleeve disposed within the recess, the sleeve being connected to the bracket; a coil spring disposed within the sleeve, one end of which is seated against the outer end of the sleeve; and an adjustable screw, having a shaft provided with a nut on which the other end of the spring is seated, for adjusting the magnitude of the stretching force applied to the measuring scale by the action of the bracket, sleeve, spring and nut.

8. In a digital electrical measuring instrument for measuring or adjusting the relative position of two objects including a longitudinally extending, bending resistant graduated measuring scale disposed within and fastened to a hollow body which is attachable to one of the objects, the improvement comprising:

the fastening of the measuring scale to the hollow body solely by a highly elastic layer interposed between only a single surface of the scale and the adjacent surface of the hollow body, so that the scale does not have any direct contact with the hollow body; and, adjustable first and second force-generating means mounted at the longitudinal ends of the hollow body for applying forces to the longitudinal ends of the measuring scale, whereby forces of equal magnitude, acting in opposite directions, may be applied to the longitudinal ends to adjust the length of the measuring scale to compensate for the guiding errors of the objects.

9. The measuring instrument of claim 8, wherein the measuring scale is glass and the scale is scanned by a photoelectric sensor mounted inside the hollow body.

10. The measuring instrument of claim 9, wherein the first and second force-generating means each include a bracket fitted around the longitudinal end of the measuring scale, a coil spring coupled to the bracket for generating force to the end of the scale, and a means mounted on the hollow body for adjusting the force generated by the spring.

11. The measuring instrument of claim 8, wherein the first and second force-generating means are compressive force-generating means for applying compressive forces to the measuring scale to compress the length of the scale.

12. The measuring instrument of claim 11, wherein the first and second force-generating means each include a bracket fitted around the longitudinal end of the measuring scale, a coil spring coupled to the bracket for generating force to the end of the scale, and a means mounted on the hollow body for adjusting the force generated by the spring.

13. The measuring instrument of claim 11, wherein the body has a recess at each longitudinal end; and the first and second force-generating means each include a bracket fitting around a longitudinal end of the scale; a coil spring disposed within the recess for applying a compressive force to the bracket; and an adjustable nut and axial bearing for adjusting the magnitude of the force applied by the spring.

14. The measuring instrument of claim 8, wherein the first and second force-generating means are tensive force-generating means for applying stretching forces to the measuring scale to stretch the length of the scale.

15. The measuring instrument of claim 14, wherein the body has a recess at each longitudinal end; and the first and second force-generating means each include a bracket attached to a longitudinal end of the scale; a sleeve disposed within the recess, the sleeve being connected to the bracket; a coil spring disposed within the sleeve, one end of which is seated against the outer end of the sleeve; and an adjustable screw, having a shaft provided with a nut on which the other end of the spring is seated, for adjusting the magnitude of the stretching force applied to the measuring scale by the action of the bracket, sleeve, spring and nut.

* * * * *